(12) United States Patent
Shao et al.

(10) Patent No.: US 10,038,198 B2
(45) Date of Patent: Jul. 31, 2018

(54) PLATINUM NANOPARTICLES HAVING HOLLOW SKELETAL STRUCTURES AND METHODS OF MAKING

(75) Inventors: Minhua Shao, Farmington, CT (US); Lesia V. Protsailo, Bolton, CT (US)

(73) Assignee: AUDI AG, Ingolstadt (DE)

( * ) Notice: Subject to any disclaimer, the term of this patent is extended or adjusted under 35 U.S.C. 154(b) by 768 days.

(21) Appl. No.: 13/578,039

(22) PCT Filed: Feb. 12, 2010

(86) PCT No.: PCT/US2010/000411
§ 371 (c)(1),
(2), (4) Date: Aug. 9, 2012

(87) PCT Pub. No.: WO2011/099955
PCT Pub. Date: Aug. 18, 2011

(65) Prior Publication Data
US 2012/0308916 A1 Dec. 6, 2012

(51) Int. Cl.
*H01M 4/92* (2006.01)
*H01M 8/1007* (2016.01)

(52) U.S. Cl.
CPC ........ *H01M 4/92* (2013.01); *H01M 8/1007* (2016.02); *H01M 4/921* (2013.01)

(58) Field of Classification Search
None
See application file for complete search history.

(56) References Cited

U.S. PATENT DOCUMENTS

| 4,163,736 A | 8/1979 | Acres et al. |
| 4,457,986 A | 7/1984 | Bindra et al. |
| 6,194,338 B1 | 2/2001 | Andolfatto et al. |
| 6,855,453 B2 | 2/2005 | Bett et al. |
| 6,936,564 B2 | 8/2005 | Butz et al. |
| 7,166,263 B2 | 1/2007 | Vanderspurt et al. |
| 7,311,754 B2 | 12/2007 | Virkar et al. |
| 7,612,011 B2 | 11/2009 | Vanderspurt et al. |
| 7,955,755 B2 | 6/2011 | McGrath et al. |
| 7,972,437 B2 | 7/2011 | Alivisatos et al. |
| 8,048,548 B2 | 11/2011 | Adzic et al. |
| 8,227,372 B2 | 7/2012 | Lopez et al. |
| 8,288,308 B2 | 10/2012 | Lopez et al. |
| 8,304,362 B2 | 11/2012 | Lopez et al. |
| 2006/0057440 A1 | 3/2006 | Ballantine et al. |
| 2006/0112785 A1 | 6/2006 | Garbar et al. |
| 2006/0134505 A1 | 6/2006 | Wang et al. |
| 2006/0135359 A1 | 6/2006 | Adzic et al. |
| 2007/0010396 A1 | 1/2007 | Giaquinta et al. |
| 2007/0026292 A1 | 2/2007 | Adzic et al. |
| 2007/0026294 A1 | 2/2007 | Shimazaki et al. |
| 2007/0031722 A1 | 2/2007 | Adzic et al. |
| 2008/0038615 A1 | 2/2008 | Son |
| 2008/0107956 A1 | 5/2008 | Yoo et al. |

(Continued)

OTHER PUBLICATIONS

International Search Report and Written Opinion dated Oct. 26, 2010, for International Application No. PCT/US2010/000415, 6 pages.

(Continued)

*Primary Examiner* — Tracy Dove
(74) *Attorney, Agent, or Firm* — Seed IP Law Group LLP

(57) ABSTRACT

A nanoparticle includes a noble metal skeletal structure. The noble metal skeletal structure is formed as an atomically thin layer of noble metal atoms that has a hollow center.

7 Claims, 4 Drawing Sheets

(56) References Cited

U.S. PATENT DOCUMENTS

| | | |
|---|---|---|
| 2008/0206562 A1 | 8/2008 | Stucky et al. |
| 2008/0286616 A1 | 11/2008 | Montupally et al. |
| 2009/0035575 A1 | 2/2009 | Tsai et al. |
| 2009/0053512 A1 | 2/2009 | Pyun et al. |
| 2009/0061286 A1 | 3/2009 | Alexandrovichserov et al. |
| 2009/0114061 A1 | 5/2009 | Strasser et al. |
| 2009/0192030 A1 | 7/2009 | Myers et al. |
| 2009/0203196 A1 | 8/2009 | Kim et al. |
| 2009/0297913 A1 | 12/2009 | Zhang et al. |
| 2009/0297924 A9 | 12/2009 | Shimazaki et al. |
| 2010/0009338 A1 | 1/2010 | Zhang et al. |
| 2010/0056366 A1 | 3/2010 | Lee |
| 2010/0099012 A1 | 4/2010 | Adzic |
| 2010/0323274 A1 | 12/2010 | Ueno et al. |
| 2011/0177432 A1 | 7/2011 | Erlebacher et al. |
| 2011/0275009 A1 | 11/2011 | Goto et al. |
| 2012/0238442 A1 | 9/2012 | Lee |

OTHER PUBLICATIONS

Lu et al., "Galvanic Replacement Reaction: A Simple and Powerful Route to Hollow and Porous Metal Nanostructures," *Proc. ImechE Part N: J. Nanoengineering and Nanosystems* 221, 2008, 17 pages.

Xu et al., "Nanotubular Mesoporous Bimetallic Nanostructures with Enhanced Electocatalytic Performance," *Advanced Materials* 21:2165-2169, 2009.

Zhang et al., "Platinum Monolayer Electrocatalysts for $O_2$ Reduction: Pt Monolayer on Pd(111) and on Carbon-Supported Pd Nanoparticles," *J. Phys. Chem B* 108:10955-10964, 2004.

Adzic et al., "Platinum Monolayer Fuel Cell Electrocatalysts," *Top Catal* 46:249-262, 2007.

Chen et al., "Alkanethiolate-Protected Copper Nanoparticles: Spectroscopy, Electrochemistry, and Solid-State Morphological Evolution," *J. Phys. Chem. B* 105:8816-8820, 2001.

Koh et al., "Electrocatalysis on Bimetallic Surfaces: Modifying Catalytic Reactivity for Oxygen Reduction by Voltammetric Surface Dealloying," *J. Am. Chem. Soc.* 129:12624-12625, 2007.

Lim et al., "Pd-Pt Bimetallic Nanodendrites with High Activity for Oxygen Reduction," *Science* 324:1302-1305, 2009.

Peng et al., "Designer platinum nanoparticles: Control of shape, composition in alloy, nanostructure and electrocatalytic property," *Nano Today* 4:143-164, 2009.

Cheng, Hao Ming et al. "Hollow Platinum Spheres with Nano-Channels: Synthesis and Enhanced Catalysis for Oxygen Reduction." The Journal of Physical Chemistry C Letters. Jan. 7, 2008, 112. pp. 7522-7526. American Chemical Society.

The International Search Report and Written Opinion in counterpart Patent Cooperation Treaty Application No. PCT/US2010/000411 filed Feb. 12, 2010.

Peng et al., "Synthesis and Oxygen Reduction Electrocatalytic Property of Platinum Hollow and Platinum-on-Silver Nanoparticles," *Chemistry of Materials* 22(3):1098-1106, 2010.

Vukmirovic et al., "Platinum Monolayer Electrocatalysts for Oxygen Reduction," *Electrochimica Acta* 52(6):2257-2263, 2007.

PLATINUM NANOPARTICLES HAVING HOLLOW SKELETAL STRUCTURES AND METHODS OF MAKING

BACKGROUND

Platinum or platinum alloy nanoparticles are well known for use as an electrocatalyst, particularly in fuel cells used to produce electrical energy. For example, in a hydrogen fuel cell, a platinum catalyst is used to oxidize hydrogen gas into protons and electrons at the anode of the fuel cell. At the cathode of the fuel cell, the platinum catalyst triggers the oxygen reduction reaction (ORR), leading to formation of water.

Although platinum is a preferred material for use as a catalyst in a fuel cell, platinum is expensive. Moreover, the fuel cell performance is dependent on the available surface area of the platinum nanoparticles. The performance of the fuel cell increases when the surface area of the platinum nanoparticles is increased by increasing the loading of platinum. However, increasing platinum loading typically also increases the cost of materials.

SUMMARY

A catalytic nanoparticle includes a noble metal skeletal structure. The noble metal skeletal structure is formed as an atomically thin layer of noble metal atoms that has a hollow center.

DETAILED DESCRIPTION

Catalytic nanoparticles having hollow skeletal structures are described herein. These catalytic nanoparticles include a platinum catalyst and can be used in fuel cells and other electrochemical devices.

Figure 1:
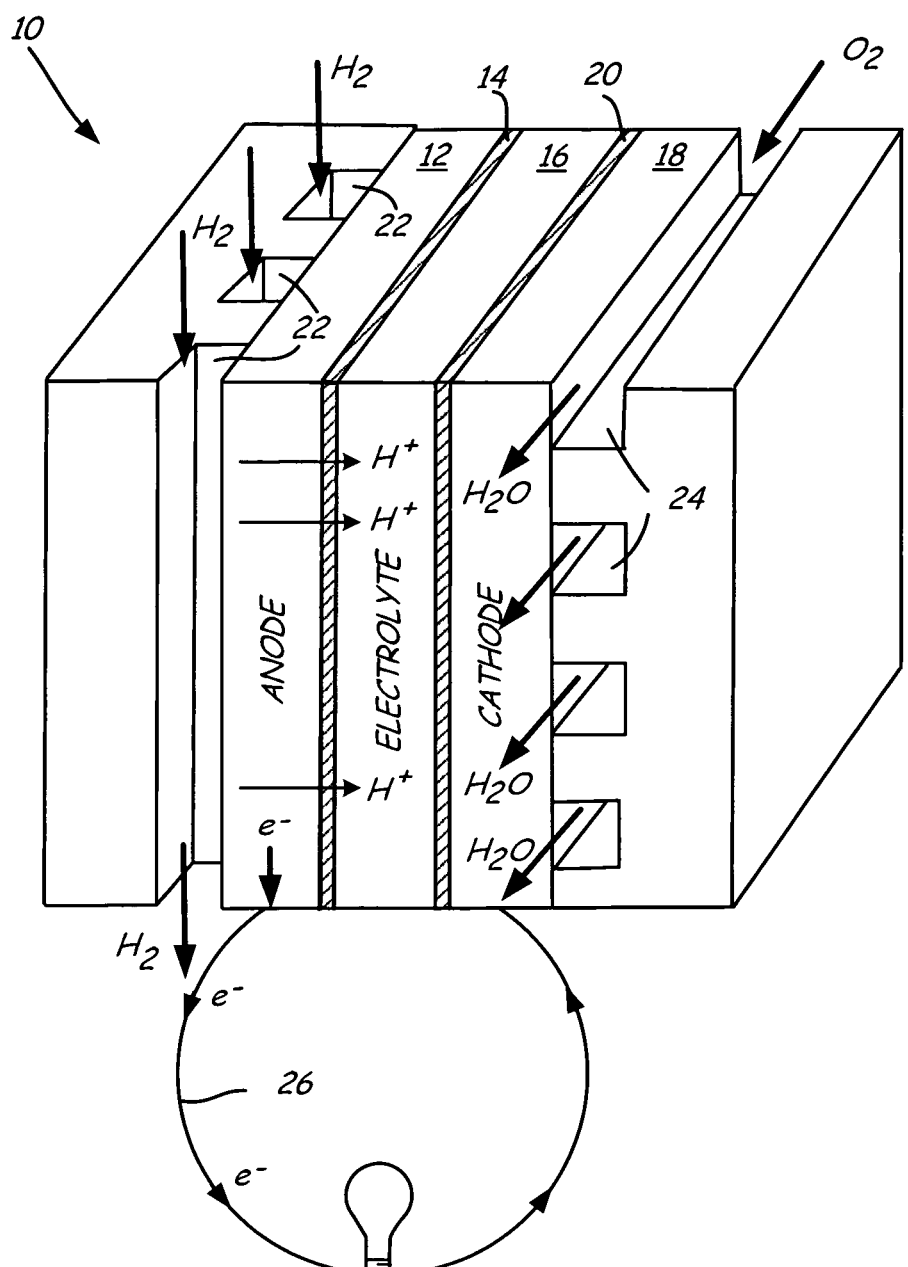
FIG. 1 is a schematic of a fuel cell that uses the catalytic nanoparticles described herein.

FIG. 1 is one example fuel cell 10, designed for generating electrical energy, that includes anode gas diffusion layer (GDL) 12, anode catalyst layer 14, electrolyte 16, cathode gas diffusion layer (GDL) 18, and cathode catalyst layer 20. Anode GDL 12 faces anode flow field 22 and cathode 18 GDL faces cathode flow field 24. In one example, fuel cell 10 is a fuel cell using hydrogen as fuel and oxygen as oxidant. It is recognized that other types of fuels and oxidants may be used in fuel cell 10.

Anode GDL 12 receives hydrogen gas ($H_2$) by way of anode flow field 22. Catalyst layer 14, which may be a platinum catalyst, causes the hydrogen molecules to split into protons ($H^+$) and electrons ($e^-$). While electrolyte 16 allows the protons to pass through to cathode 18, the electrons travel through an external circuit 26, resulting in a production of electrical power. Air or pure oxygen ($O_2$) is supplied to cathode 18 through cathode flow field 24. At cathode catalyst layer 20, oxygen molecules react with the protons from anode catalyst layer 14 to form water ($H_2O$), which then exits fuel cell 10, along with excess heat.

Electrolyte 16 varies depending on the particular type of fuel cell. In one example, fuel cell 10 is a polymer electrolyte membrane (PEM) fuel cell, in which case electrolyte 16 is a proton exchange membrane formed from a solid polymer. In another example, fuel cell 10 is a phosphoric acid fuel cell, and electrolyte 16 is liquid phosphoric acid, which is typically held within a ceramic (electrically insulating) matrix.

Platinum particles can form the basis of anode catalyst layer 14 and cathode catalyst layer 20. The platinum particles are typically dispersed and stabilized on catalyst support structures and/or on carbon. The platinum catalyst is used to increase the rate of the oxygen reduction reaction (ORR) in the fuel cell.

Figure 2:
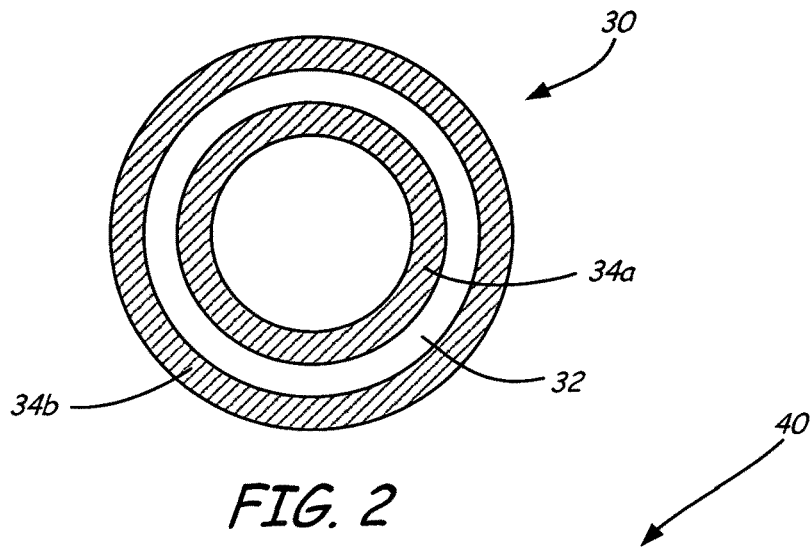
FIG. 2 is a cross-sectional view of a catalytic nanoparticle having a noble metal skeletal structure and an inner and an outer platinum layer.

FIG. 2 is a cross-sectional view of catalytic nanoparticle 30 which includes palladium skeletal structure 32, inner platinum layer 34a and outer platinum layer 34b. Catalytic nanoparticle 30 has a skeletal-shell structure.

Palladium skeletal structure 32 is a hollow skeletal structure that has an inner surface and an outer surface. Inner platinum layer 34a is on the inner surface of palladium skeletal structure 32 and outer platinum layer 34b is on the outer surface of palladium skeletal structure 32. Palladium skeletal structure 32 is an atomically thin layer of palladium atoms. In one example, palladium skeletal structure 32 is a monolayer, bilayer or trilayer of palladium atoms. Alternatively, another noble metal can be used instead of palladium in skeletal structure 32. For example skeletal structure 32 can be formed of ruthenium, rhodium, osmium, iridium or gold.

Inner platinum layer 34a and outer platinum layer 34b are atomically thin layers of platinum atoms. For example, inner platinum layer 34a and outer platinum layer 34b can be monolayers, bilayers or trilayers of platinum atoms. Outer platinum layer 34b provides a high surface area of platinum while hollow palladium skeletal structure 32 decreases costs by reducing the amount of noble metal required for catalytic nanoparticle 30. Inner platinum layer 34a further increases the surface area of platinum on catalytic nanoparticle 30. Because inner platinum layer 34a is supported by the inner surface of palladium skeletal structure 32, inner platinum layer 34a increases the available platinum surface area while not requiring additional noble metal (i.e. palladium) support material.

One skilled in the art will recognize that although palladium skeletal structure 32, inner platinum layer 34a and outer platinum layer 34b are illustrated as continuous layers having a constant thickness, they can be semi-continuous layers. For example, outer platinum layer 34b may not cover select portions of palladium skeletal structure 32. Additionally, a monolayer layer can contain pinholes that result in gaps or spaces in the layer. As described further below, the spaces in palladium skeletal structure 32 enables the formation of inner platinum layer 34a.

Figure 3:
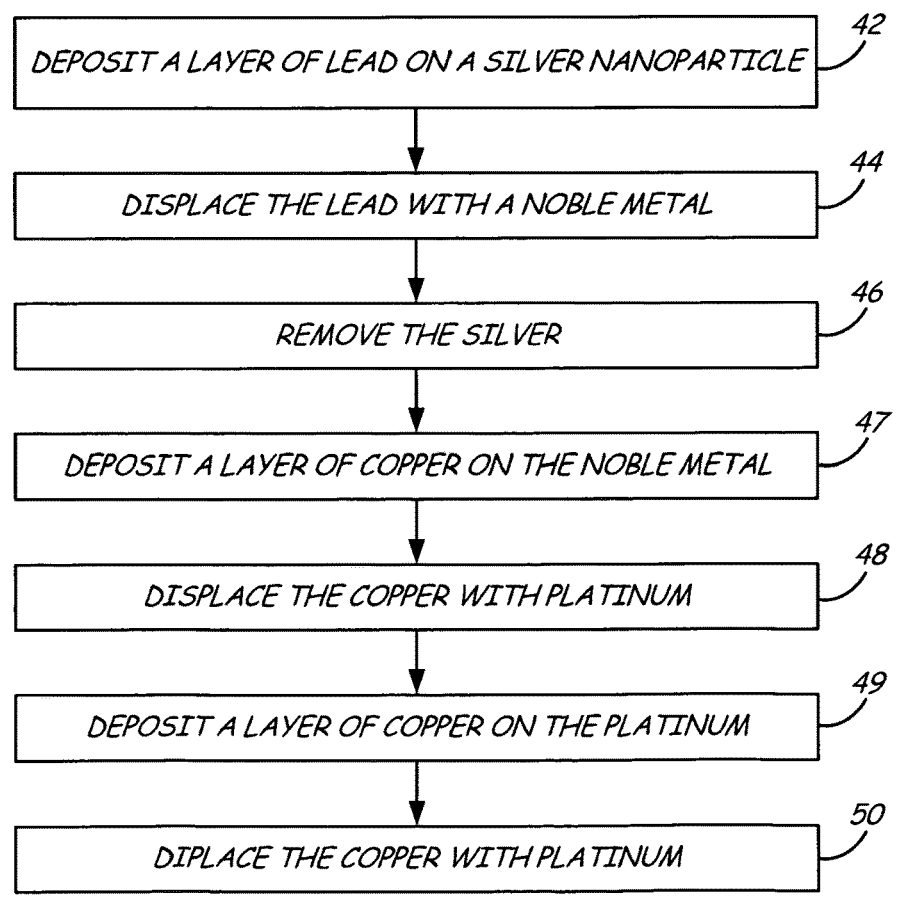
FIG. 3 is a block diagram illustrating a method of forming the catalytic nanoparticle of FIG. 2.

FIG. 3 is a block diagram illustrating method 40 for forming catalytic nanoparticle 30 of FIG. 2. Method 40 includes the steps of: depositing a layer of lead on a silver nanoparticle (step 42), displacing the lead with palladium (step 44), removing the silver (step 46), depositing a layer of copper on the palladium (step 47), displacing the copper with platinum (step 48), depositing a layer of copper on the platinum (step 49) and displacing the copper with platinum (step 50).

The first step of method 40 is to deposit a layer of lead on a silver nanoparticle (step 42). In one example, the silver nanoparticle has a diameter between about 2 nanometers (nm) and about 30 nm. The silver nanoparticle can be formed of silver or a silver alloy. In one example, thallium nanoparticles or cadmium nanoparticles are used instead of silver nanoparticles.

Lead is deposited on the silver nanoparticle by underpotential deposition. Underpotential deposition is an electrochemical process that results in the deposition of one or two monolayers of a metal (lead) onto the surface of a bulk metal (silver) at a potential positive of the thermodynamic potential for the reaction. Thermodynamically, underpotential deposition occurs because the work function of lead is lower than that of silver. The monolayer of lead can be continuous or semi-continuous. Additionally, the monolayer can contain pinholes where gaps or spaces exist in the layer. In one example, silver nanoparticles coated on an electrically conductive substrate, such as carbon paper, are placed in a solution containing lead ions and kept at a constant potential for a set period of time. In a specific example, silver nanoparticles on an electronically conductive substrate are placed in a mixture of 1 mM $Pb(NO_3)_2$+0.1 M $NaClO_4$+2 mM $HClO_4$ solution saturated with argon and kept at a potential of −0.41 V (vs. Ag/AgCl, 3M) for 5 minutes to deposit a monolayer of lead on the silver surfaces.

Next, the lead is displaced by palladium (step 44). Palladium displaces the lead atoms on the silver nanoparticle in a spontaneous oxidation reduction reaction of equation (1).

$$Pb + Pd^{2+} \rightarrow Pd + Pb^{2+} \quad (1)$$

When the lead covered silver nanoparticles are mixed with palladium ions, the palladium ions are reduced by the lead atoms and palladium atoms replace the lead atoms on the surface of the silver nanoparticle. In one example, an aqueous solution containing a palladium salt is mixed with the lead covered silver nanoparticles at room temperature via stirring. In a specific example, the palladium solution is 2 mM $Pd(NO_3)_2$+0.05 M $HClO_4$. The palladium ions of the solution are reduced by the lead and palladium displaces lead on the surface of the silver nanoparticle.

The displacement process forms an atomically thin layer of palladium atoms on the silver nanoparticle. For example, the palladium atoms can be a monolayer, a bilayer or a trilayer. The amount or thickness of the palladium layer can be controlled by the amount of palladium salts in the solution. When the palladium salt solution contains palladium salts in excess of the amount necessary to replace the lead layer, the excess palladium salts will react with silver atoms of the silver nanoparticle in a spontaneous oxidation reduction reaction of equation (2) through the pinholes of the palladium layer.

$$2Ag + Pd^{2+} \rightarrow 2Ag^{+} + Pd \quad (2)$$

In this way, additional atomically thin layers of palladium salts are formed on the silver nanoparticles. Although step 44 has been described as displacing lead with palladium, noble metals such as ruthenium, rhodium, osmium, iridium or gold can be used in place of palladium. Similar to palladium, these noble metals are reduced by lead.

After forming an atomically thin layer of palladium atoms, the silver nanoparticle is removed in step 46. For example, the silver nanoparticle can be dissolved or leached. Dissolving the silver nanoparticle forms hollow palladium skeletal structure 32 of FIG. 2. The silver nanoparticle served as a support for the deposition of the palladium atoms. After depositing the palladium atoms, the silver nanoparticle is removed to form a hollow palladium skeleton. The thin layer of palladium atoms deposited on the silver nanoparticle does not completely encompass the silver nanoparticle. Small spaces in the layer of palladium allow the silver to be dissolved or leached.

The silver nanoparticle can be dissolved using a nitric acid ($HNO_3$) solution. The concentration of the nitric acid solution and the temperature of the reaction are controlled to dissolve silver while preventing the dissolution of the palladium (or other noble metal) monolayer. For example, the concentration of nitric acid can be in the range of about 1 M to about 3 M, and the temperature of the dissolution process can be between about 20 degrees Celsius and about 60 degrees Celsius.

Alternatively, the silver nanoparticle can be dissolved by an electrochemical method. In one example, silver is dissolved by potential cycling in the potential range of 0-1.0 V (vs. RHE) in a 0.1 M $HClO_4$ solution at room temperature. The dissolved silver can be recovered and reused. Recycling the silver reduces the cost of creating catalytic nanoparticle 30.

In one example, silver is removed completely so there is no trace of silver in palladium skeletal structure 32, and palladium skeletal structure 32 is unsupported. In another example, trace amounts of silver remain in palladium skeletal structure 32. Removing the silver avoids possible silver contamination during use of the catalyst. For example, removing the silver reduces or eliminates the risk of silver contamination of the membrane when used in a PEM fuel cell. When the silver nanoparticle is a silver alloy, the silver alloy is removed in step 46.

After removing the silver, copper atoms are deposited on palladium skeletal structure 32 in step 47. The copper atoms are deposited by underpotential deposition to form a monolayer on palladium skeletal structure 32. In one example, palladium skeletal structures 32 deposited on a carbon paper were placed in a solution consisting of 0.05 M $CuSO_4$+0.05 M $H_2SO_4$ saturated with argon and the potential was controlled at 0.1 V (vs. Ag/AgCl, 3M) for 5 minutes resulting in underpotential deposition of copper on palladium skeletal structures 32. One skilled in the art will recognize that many alternative methods can be used for the underpotential deposition of copper on palladium skeletal structure 32.

Because the silver nanoparticle has been dissolved, palladium skeletal structure 32 is hollow and has an inner surface and an outer surface. Further, as described above, small spaces or gaps can be present between adjacent atoms of palladium skeletal structure 32. These gaps enable a monolayer of copper atoms to deposit on the inner surface and the outer surface of palladium skeletal structure 32. The copper layer can be continuous or semi-continuous. Alternatively, any transition metal that can be deposited on silver by underpotential deposition and that reduces platinum in an oxidation reduction reaction can be used in place of copper.

In step 48, the copper is displaced with platinum. Through an oxidation reduction reaction, platinum atoms displace the copper atoms on palladium skeletal structure 32 to form catalytic nanoparticle 30 of FIG. 2. For example, palladium skeletal structures 32 can be mixed with an aqueous solution containing a platinum salt. Platinum ions of the solution are spontaneous reduced by copper as shown in equation (3), and platinum replaces copper on palladium skeletal structure 32.

(3)

An example platinum solution is 2 mM PtK$_2$Cl$_4$+0.05 H$_2$SO$_4$ saturated with argon. The platinum atoms form a platinum monolayer. The platinum monolayer can be atomically thick and continuously cover skeletal structure 32. Alternatively, the platinum layer may not cover small portions of skeletal structure 32.

A nanoparticle 30 having an atomically thin layer of platinum is formed after step 48. Additional platinum layers can be added in steps 49 and 50. In step 49, a layer of copper is deposited on the platinum layer with underpotential deposition. For example, nanoparticles 30 were placed in a solution consisting of 0.05 M CuSO$_4$+0.05 M H$_2$SO$_4$ saturated with argon and the potential was controlled at 0.1 V (vs. Ag/AgCl, 3M) for 5 minutes resulting in underpotential deposition of copper on nanoparticles 30.

In step 50, the copper is displaced with platinum. The copper can be displaced with platinum according to the oxidation reduction reaction described above with respect to step 48. Performing steps 49 and 50 will form an additional layer of platinum atoms on skeletal structures 32. Platinum has a higher mass activity than other noble metals. Therefore, depositing platinum atoms on palladium skeletal structures 32 improves the activity of the structure and improves the operation of the fuel cell into which catalytic nanoparticles 30 are incorporated.

Using the silver nanoparticle as a support for palladium skeletal structure 32 reduces the cost of manufacturing catalytic nanoparticle 30. The cost of silver is negligible compared to the cost of using another noble metal. For example, in January 2010, the cost of silver was around $20 (USD) per 28 grams (1 ounce) while the cost of palladium was around $400 (USD) per 28 grams (1 ounce) and platinum was around $1500 (USD) per 28 grams (1 ounce).

Removing the silver to form palladium skeletal structure 32 reduces or eliminates the risk of silver contamination during use in a fuel cell. As described above, the leached silver can be recovered and reused. Reusing or recycling the silver further reduces the cost of manufacture.

Removing the silver also allows an increased surface area of palladium on which platinum atoms can be deposited. Removing the silver nanoparticle to form a hollow skeletal structure enables deposition of platinum atoms on the inner surface and on the outer surface of palladium skeletal structure 32. In comparison, if palladium skeletal structure 32 was not hollow, platinum could only deposit on the outer surface of palladium skeletal structure 32.

The higher surface area of platinum results in catalytic nanoparticle 30 having a higher platinum mass activity compared to other platinum catalytic structures. For example, carbon supported platinum particles have a platinum mass activity of 0.2 A/mg of platinum, platinum monolayer deposited on carbon supported palladium nanoparticles have a platinum mass activity of 0.67 A/mg of platinum, and nanoparticles 30 having a platinum monolayer deposited on hollow palladium skeletal structures have a platinum mass activity of 1.5 A/mg of platinum.

In addition to the increased platinum surface area, hollow palladium skeletal structure 32 also contributes to the increased platinum mass activity. The palladium of skeletal structure 32 has an electronic effect on platinum layers 34$a$ and 34$b$. Additionally, the palladium also has a structural effect on the platinum because palladium has a smaller lattice constant than platinum. Platinum layers 34$a$ and 34$b$ must form a lattice constant similar to the lattice constant of skeletal structure 32. Therefore, platinum layers 34$a$ and 34$b$ have a smaller lattice constant than bulk platinum. This increases the platinum mass activity of nanoparticles 30.

Further, as described above, the silver nanoparticle can be a silver alloy. Using a silver alloy containing a transition metal, such as copper, enables the activity of platinum layers 34$a$ and 34$b$ to be further tuned. The silver alloy can further change the lattice constant of skeletal structure 32 and thus of platinum layers 34$a$ and 34$b$. The silver alloy can be adjusted to tailor the lattice constant of platinum layers 34$a$ and 34$b$ to increase the platinum mass activity of catalytic nanoparticles 30.

Figure 4:
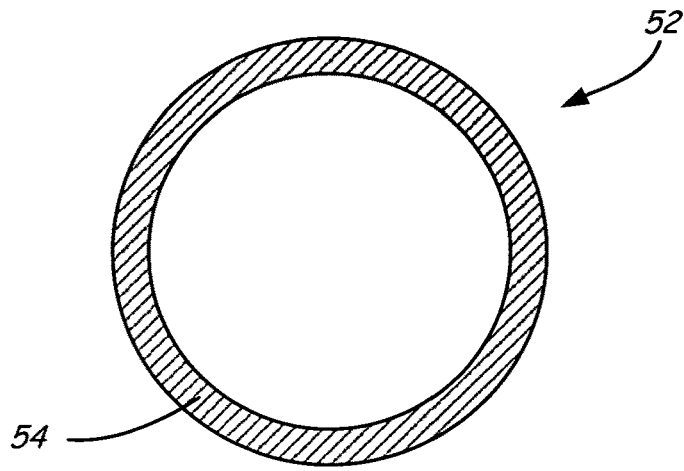
FIG. 4 is a cross-sectional view of a catalytic nanoparticle having a hollow platinum skeletal structure.

Nanoparticles 30 have been described above as having palladium skeletal structures 32 with inner and outer platinum layers 34$a$ and 34$b$. In another example, the palladium of skeletal structure 32 is replaced with platinum. The resulting nanoparticles are free standing platinum skeletal structures. FIG. 4 is a cross-sectional view of catalytic nanoparticle 52 having hollow platinum skeletal structure 54. Platinum skeletal structure 54 is an atomically thin layer of platinum atoms. In one example, platinum skeletal structure 54 is a monolayer, bilayer or trilayer of platinum atoms.

Catalytic nanoparticle 52 is hollow. That is, platinum skeletal structure 54 is an unsupported layer of platinum atoms. Platinum skeletal structure 54 is similar to inner and outer platinum layers 34$a$ and 34$b$ of nanoparticle 30. For example, platinum skeletal structure 54 can have small gaps or spaces between the platinum atoms. Additionally, platinum skeletal structure 54 can be formed of continuous or semi-continuous layer(s) and can have a varying thickness. Nanoparticles 52 result in further reducing the noble metal loading compared to catalytic nanoparticles 30 of FIG. 2. Nanoparticles 52 can be supported on carbon and used in a fuel cell. Because platinum skeletal structure 54 is hollow, the inner and outer surfaces of platinum skeletal structure 54 are available for reactions. Thus, nanoparticle 52 has a higher surface area and a lower cost than a solid platinum nanoparticle of the same size.

Figure 5:
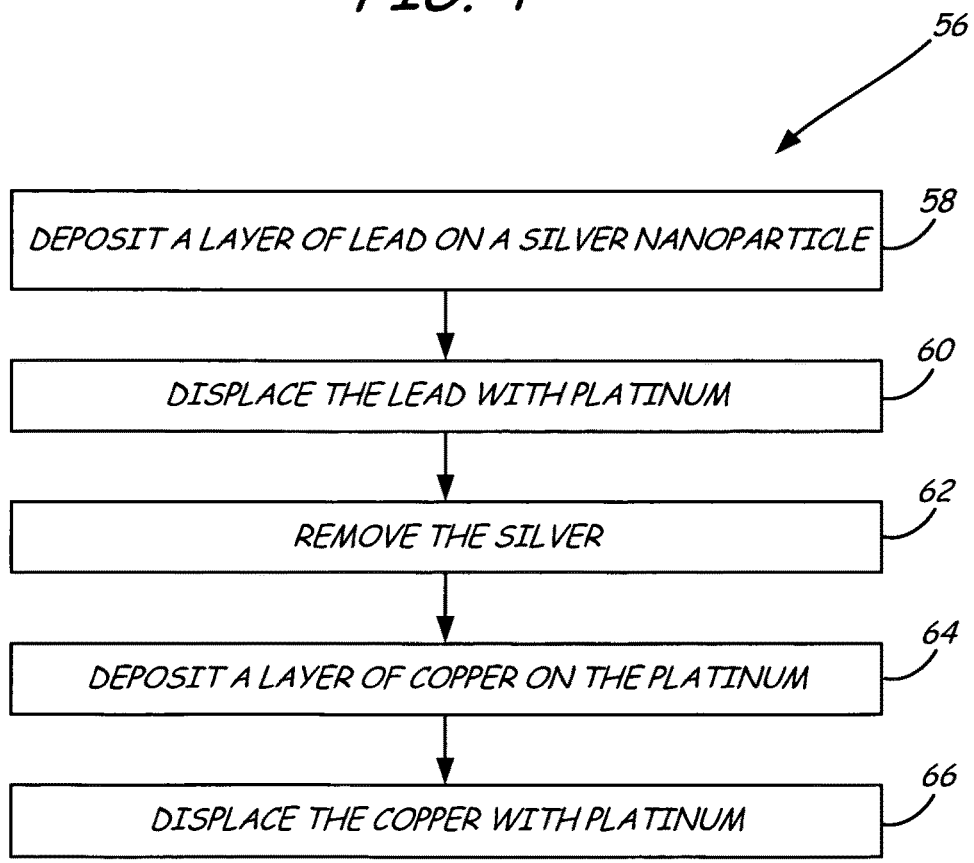
FIG. 5 is a method of forming the catalytic nanoparticle of FIG. 4.

FIG. 5 is a flow diagram illustrating method 56 for forming nanoparticle 52 of FIG. 4. Method 56 includes the steps of depositing a layer of lead on a silver nanoparticle (step 58), displacing the lead with a layer of platinum (step 60), removing the silver (step 62), depositing a layer of copper (step 64) and displacing the copper with platinum (step 66).

In step 58, a monolayer or bilayer of lead atoms is deposited by underpotential deposition on to a silver nanoparticle. The silver nanoparticle supports the lead atoms and the lead atoms form a shell around the silver nanoparticle. In one example, the silver nanoparticle can have a diameter between about 2 nm and about 30 nm. As discussed above, the silver nanoparticle can be formed of silver or a silver alloy.

In step 60, the lead atoms on the silver nanoparticle are displaced with platinum atoms in an oxidation reduction reaction according to equation (4).

(4)

When the lead covered silver nanoparticles are mixed with platinum ions, the platinum ions are reduced by the lead atoms and the platinum atoms replace the lead atoms on the surface of the silver nanoparticle. In one example, an aqueous solution containing a salt of platinum is mixed with the lead covered silver nanoparticles at room temperature via stirring. An example platinum solution is 1 mM PtK$_2$Cl$_4$+0.05 H$_2$SO$_4$.

The platinum atoms form a monolayer, bilayer or trilayer on the silver nanoparticle. As described above, platinum skeletal structure 54 is an atomically thin layer of platinum atoms, such as a monolayer, a bilayer or a trilayer. The platinum layer can have pinholes or gaps so that platinum atoms do not completely cover the silver nanoparticle. The amount or thickness of the platinum layer is controlled by the amount of platinum salts in the solution. If the solution contains platinum salts in excess of the amount required to replace the lead layer, the excess platinum salts will react with silver atoms in a spontaneous oxidation reduction according to equation (5) through the pinholes of the platinum layer.

$$2Ag+Pt^{2+} \rightarrow 2Ag^{+}+Pt \quad (5)$$

In this way, a bilayer or trilayer of platinum atoms is formed on the silver nanoparticle. The amount of platinum salts in the solution can be controlled to control the thickness of the platinum layer of skeletal structure 54.

Finally, in step 62, the silver is removed to form platinum skeletal structure 54. The silver nanoparticle can be removed by, for example, dissolution in an acid or an electrochemical process as described above. The silver nanoparticle can be dissolved by mixing the platinum covered nanoparticles with a nitric acid ($HNO_3$) solution. The concentration of the nitric acid solution and the temperature of the reaction are controlled to dissolve silver while preventing the dissolution of the platinum monolayer. For example, the concentration of nitric acid can be in the range of about 1 M to about 8 M and the temperature of dissolution process can be between about 20 degrees Celsius and about 80 degrees Celsius.

Alternatively, the silver nanoparticle can be dissolved by an electrochemical method. In one example, silver is dissolved by potential cycling in a potential range of 0-1.0 V in a 0.1 M $HClO_4$ solution. The dissolved silver can be recovered and reused. Removing the silver nanoparticle creates a free standing hollow structure or skeleton of platinum atoms. Spaces or gaps can exist between the platinum atoms of platinum skeletal structure 54. During the removal process, the silver atoms dissolve and are removed through these spaces.

Nanoparticle 52 having a monolayer of platinum is formed after step 62. Nanoparticle 52 can then be used in a fuel cell or other application. Alternatively, an additional layer of platinum can be deposited on platinum skeletal structure 54 in steps 64 and 66. In step 64, a layer of copper is deposited by underpotential deposition on platinum skeletal structure 54. For example, platinum skeletal structures 54 were placed in a solution consisting of 0.05 M $CuSO_4$+ 0.05 M $H_2SO_4$ saturated with argon and the potential was controlled at 0.1 V (vs. Ag/AgCl, 3M) for 5 minutes resulting in underpotential deposition of copper on platinum skeletal structures 54.

After depositing a monolayer of copper atoms on platinum skeletal structure 54, the copper atoms are displaced by platinum in step 66. For example, copper coated platinum skeletal structure 54 can be mixed with an aqueous solution of a platinum salt. The copper atoms will reduce the platinum ions and platinum atoms will replace the copper atoms on the surface of platinum skeletal structure 54 as described above with respect to step 48. The additional layer of platinum atoms forms platinum skeletal structure 54 into a bilayer or a trilayer of platinum atoms. Steps 64 and 66 can be repeated to form additional layers of platinum atoms on platinum skeletal structure 54.

The silver has an electronic effect and a structural effect on the platinum and increases the mass activity of platinum skeletal structure 54. Additionally, using a silver alloy containing a transition metal allows the activity of the platinum to be further tuned through adjusting the lattice constant of the silver nanoparticle.

Nanoparticle 52 has benefits similar to catalytic nanoparticle 30 of FIG. 2 including an increased platinum mass activity and reduced cost of manufacturing. The cost of manufacturing nanoparticle 52 is further reduced by further reducing the noble metal loading of the catalytic structure.

The present invention is more particularly described in the following examples that are intended as illustration only, since numerous modifications and variations within the scope of the present invention will be apparent to those skilled in the art.

EXAMPLE 400 mg of 40% silver nanoparticles supported on carbon black were cast on a carbon paper with a loading of 0.2 mg silver/$cm^2$ to form an electrode. The electrode was placed in an electrochemical cell with a solution consisting of 1 mM $Pb(NO_3)_2$+0.1 M $NaClO_4$+2 mM $HClO_4$ saturated with argon and the potential was kept at −0.41 V (vs. Ag/AgCl, 3M) for 5 minutes to deposit a full layer of lead on the silver nanoparticles. A 200 ml solution of 2 mM $Pd(NO_3)_2$+0.05 M $HClO_4$ was immediately added into the cell without potential control. The reaction was kept for 30 minutes to ensure all the lead was displaced by palladium.

The cell was washed with water and a new solution of 0.1 M $HClO_4$ saturated with argon was added. The silver was dissolved by potential cycling in the potential range of 0.02-1.0 V (Vs. RHE) at room temperature for 20 cycles. The CV of the resulting hollow palladium skeletal structure is shown in FIG. 6 (labeled Pd), described further below.

The hollow palladium skeletal structures were placed in a cell with a solution consisting of 0.05 M $CuSO_4$+0.05 M $H_2SO_4$ saturated with argon. The potential was controlled at 0.1 V (vs. Ag/AgCl, 3M) for 5 minutes to deposit a monolayer of copper on the palladium skeletal structures. A 200 ml solution of 2 mM $PtK_2Cl_4$+0.05 M $H_2SO_4$ saturated with argon was added into the cell quickly without potential control. The reaction was kept for 30 minutes to ensure all the copper atoms were displaced by platinum. The final products were collected by washing with water and drying in an oven. The CV of the resulting catalytic nanoparticle is shown in FIG. 6 (labeled Pt on Pd).

Figure 6:
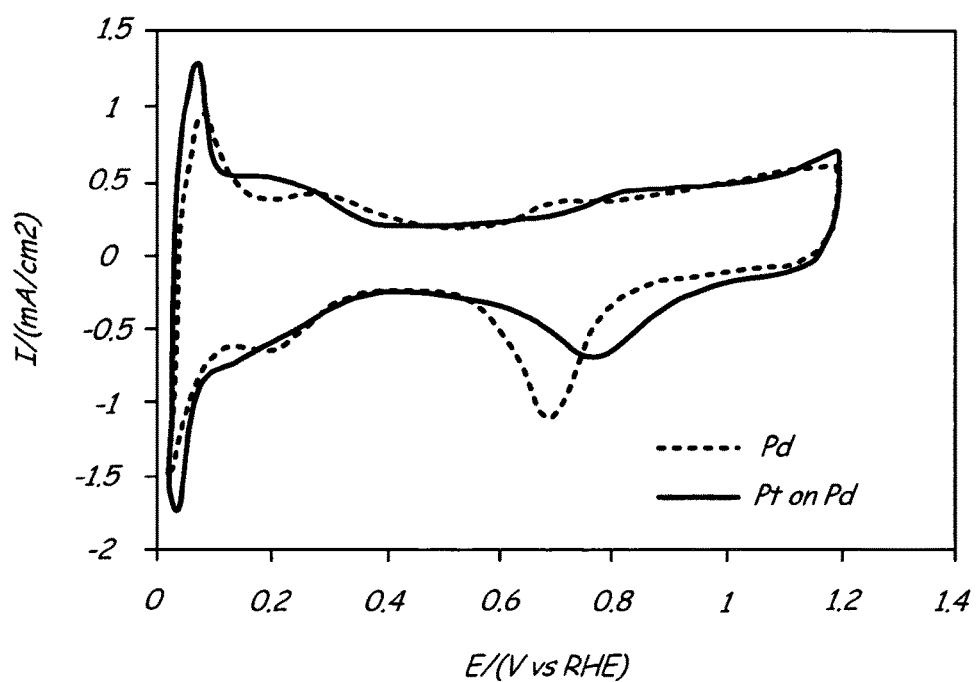
FIG. 6 is a plot of cyclic voltammograms of hollow palladium skeletal structures and thin platinum layers on hollow palladium skeletal structures.

FIG. 6 plots the cyclic voltammograms (CV) during potential cycling of two working electrodes versus a reversible hydrogen electrode (V/RHE). The potential cycle occurred in 0.1 M $HClO_4$ at a scan rate of 0.05 V/s and a temperature of 25° C. The first electrode illustrated in the CV contains hollow palladium skeletal structures after removing silver but before the deposition of platinum (labeled Pd in FIG. 6). The second electrode illustrated in the CV contains hollow palladium skeletal structures having a platinum monolayer (labeled Pt on Pd in FIG. 6). The CV of the first electrode (labeled Pd) illustrates that the surface of palladium skeletal structure 32 is similar to the surface of a pure palladium nanoparticle. Thus, the silver was completely or almost completely removed during the leaching process. The CV of the second electrode (labeled Pt on Pd) illustrates the formation of nanoparticles having palladium skeletal structures and an atomically thin layer of platinum.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of forming a nanoparticle, the method comprising:
   depositing an atomically thin layer of lead atoms on a silver or silver alloy nanoparticle;
   replacing the atomically thin layer of lead atoms with noble metal atoms to form an atomically thin layer of noble metal atoms having a plurality of spaces;
   forming a hollow noble metal skeleton structure having an inner skeletal structure surface and an outer skeletal structure surface by dissolving the silver or silver alloy nanoparticle, the plurality of spaces in the atomically thin layer of noble metal atoms facilitating the dissolving of the silver or silver alloy nanoparticle; and
   depositing platinum atoms on the hollow noble metal skeleton structure, the depositing of platinum atoms forming an inner layer on the inner skeletal structure surface and an outer layer on the outer skeletal structure surface, wherein the forming of the outer layer includes forming a first layer of platinum atoms on the outer skeletal structure surface of the hollow noble metal skeletal structure, the first layer of platinum atoms comprising a discontinuous structure that only partially covers the outer skeletal structure surface.

2. The method of claim 1, wherein the noble metal atoms are selected from the group consisting of ruthenium, rhodium, palladium, osmium and iridium atoms.

3. The method of claim 2, wherein the silver or silver alloy nanoparticle is dissolved prior to the depositing of the platinum atoms on the inner skeletal structure surface of the hollow noble metal skeleton structure.

4. The method of claim 1, wherein the silver or silver nanoparticle has a diameter between about 2 nanometers and about 30 nanometers.

5. The method of claim 1, further comprising:
   forming a second layer of platinum atoms on the first layer of platinum atoms.

6. A method of forming a nanoparticle, the method comprising:
   depositing an atomically thin layer of lead atoms on a silver or silver alloy nanoparticle,
   replacing the atomically thin layer of lead atoms with noble metal atoms to form an atomically thin layer of noble metal atoms having a plurality of spaces;
   forming a hollow noble metal skeleton structure having an inner skeletal structure surface and an outer skeletal structure surface by dissolving the silver or silver alloy nanoparticle, the plurality of spaces in the atomically thin layer of noble metal atoms facilitating the dissolving of the silver or silver alloy nanoparticle; and
   depositing platinum atoms on the hollow noble metal skeleton structure, the depositing of platinum atoms, forming an inner layer on the inner skeletal structure surface and an outer layer on the outer skeletal structure surface, wherein the depositing of the inner layer or the outer layer includes forming a first layer of platinum atoms, and forming a second layer of platinum atoms on the first layer of platinum atoms.

7. A method of forming a nanoparticle, the method comprising:
   depositing an atomically thin layer of lead atoms on a silver or silver alloy nanoparticle;
   replacing the atomically thin layer of lead atoms with noble metal atoms to form an atomically thin layer of noble metal atoms having a plurality of spaces;
   forming a hollow noble metal skeleton structure having an inner skeletal structure surface and an outer skeletal structure surface by dissolving the silver or silver alloy nanoparticle, the plurality of spaces in the atomically thin layer of noble metal atoms facilitating the dissolving of the silver or silver alloy nanoparticle;
   depositing platinum atoms on the hollow noble metal skeleton structure, the depositing of platinum atoms forming an inner layer on the inner skeletal structure surface and an outer layer on the outer skeletal structure surface, wherein the forming of the outer layer includes:
   forming a first layer of platinum atoms on the outer skeletal structure surface of the hollow noble metal skeletal structure, the first layer of platinum atoms only partially covering the outer skeletal structure surface, and
   forming a second layer of platinum atoms on the first layer of platinum atoms on the outer skeletal structure surface.

* * * * *